United States Patent [19]

Lopez

[11] Patent Number: 5,716,095
[45] Date of Patent: Feb. 10, 1998

[54] CHILD SAFETY SEAT ACCESSORY

[76] Inventor: Robelin J. Lopez, 2521 25th Ct., Jupiter, Fla. 33477

[21] Appl. No.: 783,673

[22] Filed: Jan. 15, 1997

[51] Int. Cl.⁶ ..................................... B60N 2/28
[52] U.S. Cl. ................. 297/184.13; 297/216.11; 297/487; 297/256.16
[58] Field of Search ............ 297/184.13, 216.11, 297/256.15, 256.16, 487, 488

[56] References Cited

U.S. PATENT DOCUMENTS

| | | |
|---|---|---|
| 4,067,608 | 1/1978 | Wimmersperg . |
| 4,082,350 | 4/1978 | Tomforde . |
| 4,314,727 | 2/1982 | Potts ........................ 297/184.3 X |
| 4,500,135 | 2/1985 | Kincheloe . |
| 4,591,208 | 5/1986 | McDonald . |
| 4,750,783 | 6/1988 | Irby et al. .................. 297/256.16 |
| 4,790,593 | 12/1988 | Davalos . |
| 4,883,315 | 11/1989 | Ferguson .................. 297/184.13 X |
| 5,083,837 | 1/1992 | Roach ...................... 297/184.13 X |
| 5,094,506 | 3/1992 | Costa ....................... 297/184.13 X |
| 5,332,292 | 7/1994 | Price . |
| 5,468,047 | 11/1995 | Goor . |
| 5,556,162 | 9/1996 | Raffini .................... 297/488 |

*Primary Examiner*—Peter R. Brown
*Attorney, Agent, or Firm*—McHale & Slavin

[57] ABSTRACT

A child safety seat accessory apparatus for use in conjunction with a conventional child car seat which allows placement of the child car seat within an inner containment cavity from a seat containment casing. The casing includes a protective shield which protects the child occupant from the impact of an air bag and other flying debris in the event of an accident. The device is constructed from a one piece seat containment casing having a pivotally coupled transparent shield rotatably secured to the front portion of the casing. Release latches allow for ease of insertion of a child into the proper position in relation to the car seat wherein the shield is rotated allowing access to an inner cavity formed by the casing.

11 Claims, 3 Drawing Sheets

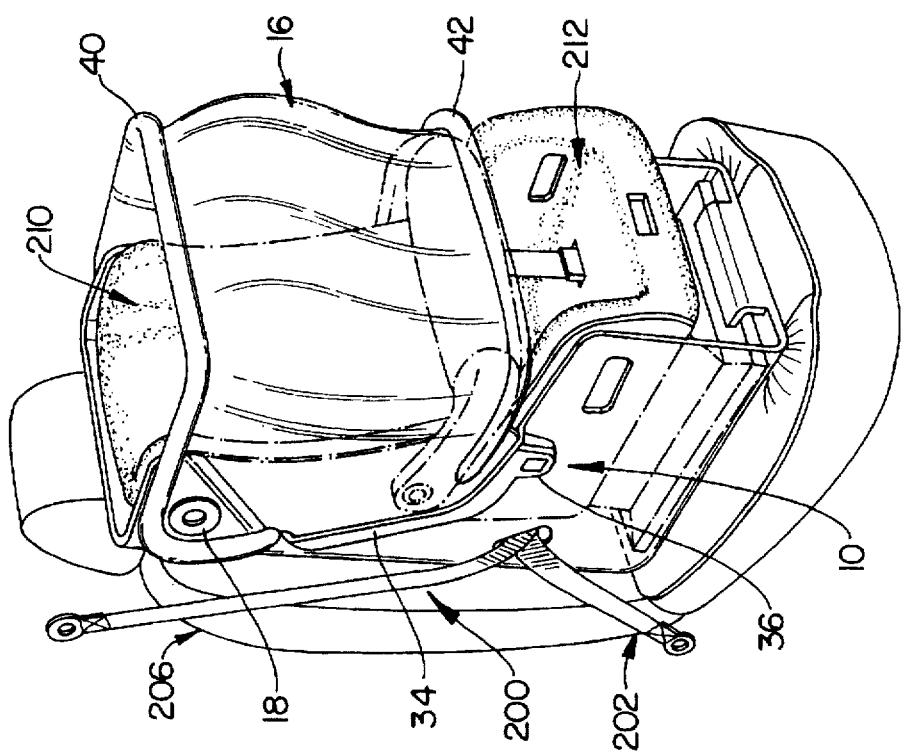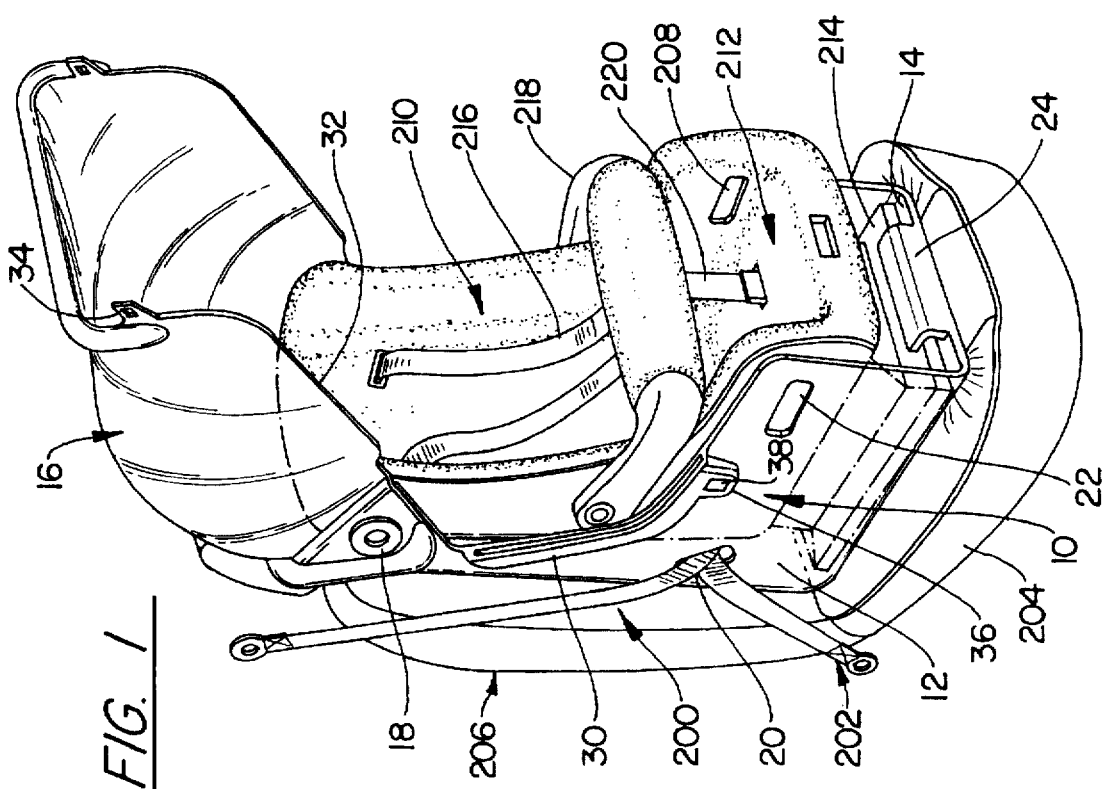

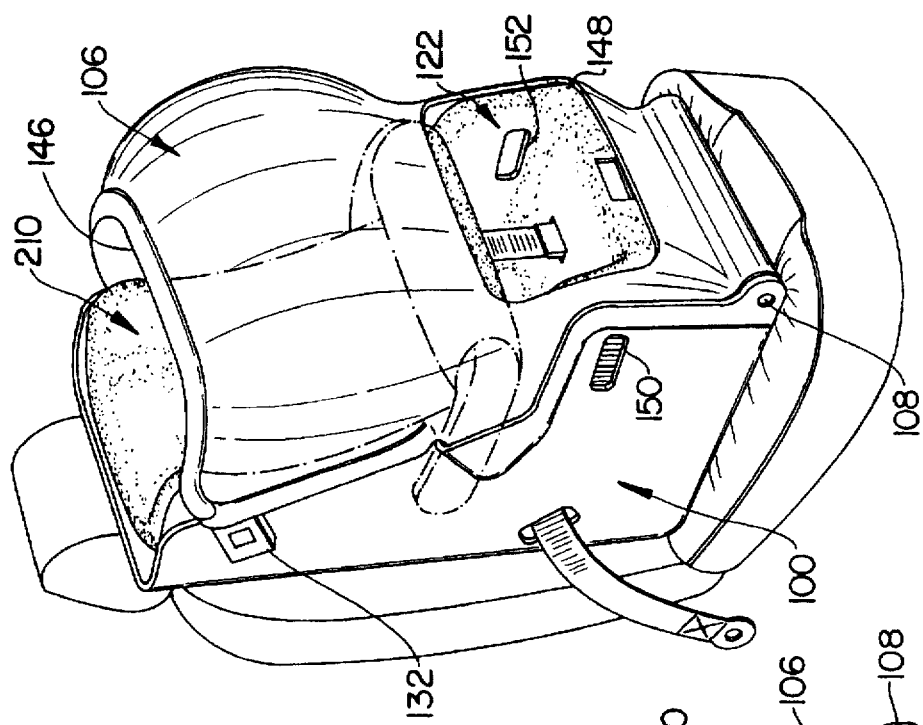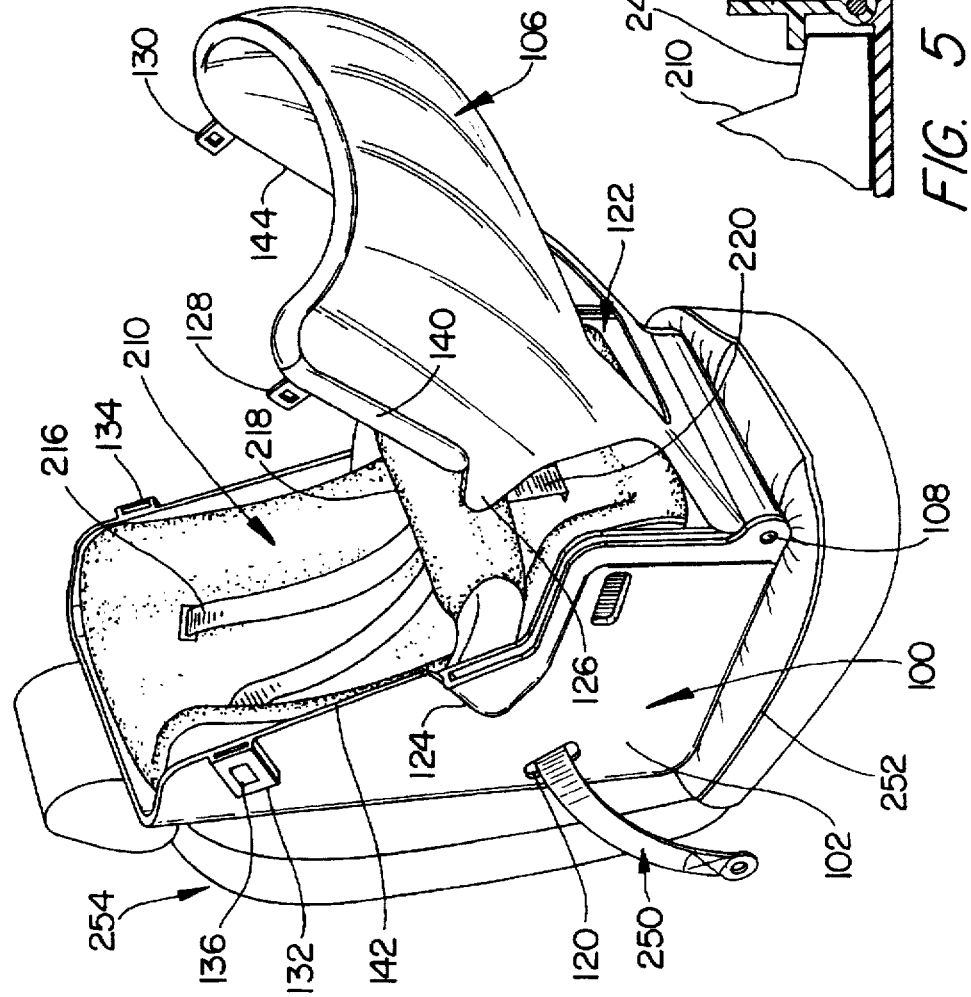

CHILD SAFETY SEAT ACCESSORY

FIELD OF THE INVENTION

This invention is directed to the field of child safety in an automobile environment and in particular to a seat containment casing capable of encompassing a conventional child safety seat for use in protecting the child during an automobile accident and particularly from air bag deployment.

BACKGROUND OF THE INVENTION

The use of automobile air bags has saved the lives of countless adults during an automobile accident. The air bag is deployed by the use of a pressurized gas canister that is released when the automobile strikes a fixed object. Once inflated the air bag operates as a cushion to prevent the individual from striking the dash or being projected through the windshield. In effect, the air bag operates as a momentary restraint securing the individual in a fixed position during the most critical moment of a vehicle accident. Should the air bag accidentally deploy, it may slightly injure an adult but typically does not cause more than an inconvenience.

Seating arrangement and air bag deployment are designed for adults. For this reason, child car seats are mandatory in most States including the requirement that the child is secured in the child car seat during vehicle movement. A problem arises in that the air bag deployment can seriously injure a child who is too fragile to withstand the impact of the air bag. Air bag deployment can reach a velocity of over 200 miles per hour and may severely injure a child upon impact. In addition, should the child car seat be facing in a rearward position which was believed to reduce the impact from the air bag, the child can be even further injured from the unrestrained rearward movement and in at least one instance—decapitation. In 1996 the rate of death to children as a direct result of air bag deployment is documented as one per month. It is believed that this rate will increase as more automobiles are being placed on the road having air bags installed as standard equipment.

There are numerous products for protecting a child while traveling in an automobile. Typically these devices relate to child car seats and a number of device attempt to address the problems with air bags. However, a number of the devices fail to disclose a product that is suitable for use with an existing child car seat. For instance, U.S. Pat. No. 4,790,593 discloses a device for placement of an infant in an oval-shaped shell. The shell is made of impact resistant material and protects the head, torso and lower portion of an infant. However, this device replaces an automobile seat and operates as a cocoon with a plurality of apertures placed around the shell for air. The disadvantage to this device is that it lacks the comforts of a child car seat and creates a large and unwieldy device that is difficult to store and prohibits visual inspection of the child.

U.S. Pat. No. 4,500,135 discloses an infant car seat having a structure that in the event of a crash folds upward to cushion the impact. This device could lead to injury in and of itself should an arm or leg become extended during an accident. Similarly, should an adult be near the device when an accident occurs, they could be severely injured should the device instantly close.

U.S. Pat. No. 4,591,208 discloses a child car seat having an integrated safety shield placed over the front portion of the seat. This device sets forth a means for protecting a portion of the child but requires a special design child car seat formed to receive the safety shield. In this manner, the safety shield and child car seat must have reciprocating parts requiring the consumer to buy a particular seat should the consumer also desire the safety shield. The disadvantage is mainly directed to those consumers who have child car seats that would need to be replaced.

U.S. Pat. No. 5,556,162 discloses a child car seat protection device which forms a frame placed over a child car seat and includes a padded bar positioned in front of the child for protection during an accident. This device does not have a means for securement against air bags as the bars would allow an air bag to inflate within the openings as well as project any glass that may be present during a vehicle accident. In addition, this device does not have a locking mechanism so as to maintain the safety bar in a fixed position during an accident wherein a sudden stop may cause the safety bar to move in a forward position. The resulting backlash could cause the safety bar to either wrap over the child's head, making the safety bar nonexistent, or slam back into position where it may cause injury to the child. The apparent intent of this invention was to provide a frame which would allow an adult to take a child into an area that is typically less protected such as in a stroller. An example is provided wherein the child is placed next to a flight of stairs and if the child fell down the steps while within the framework, the device would protect the child from injury by allowing the frame to roll onto an upright position.

U.S. Pat. No. 4,082,350 discloses a shell shaped seat for an automobile vehicle that includes a shield that folds over the seat for positioning in front of the child, maintaining the child in position should stoppage occur. This device includes padding within the shell which is designed to prevent slippage of the child during acceleration of the vehicle. The disadvantage of this seat is that it is limited to consumers that buy these particular seats and prevents a parent from using preexisting child car seats.

U.S. Pat. No. 4,067,608 discloses a child car seat with an enlarged front support which provides a means for protecting of the child during the accident but fails to provide a means for protecting the child from an inflating air bag.

U.S. Pat. No. 5,468,047 discloses a child safety seat with integrated support bars designed to help prevent intrusion of an air bag into the child's securement area when the child car seat is placed in a rearward direction. The design of the seat forces the child downward while the air bag is inflated over the child, but, as depicted in FIG. 8 of the patent, can still provide intrusion into the child's space and it lacks any means for protecting the child from flying debris.

U.S. Pat. No. 5,332,292 discloses a portable protective cushion for a child car seat which allows maintenance of the child in an upright position but fails to address the needs of a smaller child who must be placed in an infant seat to prevent air bag intrusion.

Thus, what is lacking in the art is a device capable of accommodating conventional infant seats that includes a means for preventing intrusion of an air bag into the space occupied by the child.

SUMMARY OF THE INVENTION

The instant invention is a child safety seat accessory for placement in an automobile. The apparatus is a child car seat containment casing which includes an inner containment cavity for placement of a conventional child's car seat. Provisions allow for securing the apparatus and the child car seat to the automobile seat. The apparatus includes a transparent shield that is placed over the front of the casing device thereby encapsulating the child within the protective device. An opening along the bottom of the shield allows the child's feet to extend outward as well as allow for adequate ventilation.

The protective shield may include a plurality of apertures further allowing increased ventilation although it has been found that a solid shield having an opening along the upper portion does not inhibit ventilation and direct drafts from an open window or air conditioner duct yet protects the child from flying objects. The rigidity of the shield and casing protects the child from a frontal impact of a deploying air bag as well as from side air bag deployment. The transparent shield is rotatably secured in front of the child and is locked in place by use of depression tabs which securely position the shield in place. An edge of the shield has a shape that communicates with the reciprocating receptacle formed in the casing so as to prevent the shield from movement when an air bag is deployed and further directing the force of the deployment to the casing so as to prevent accidental dislodgement of the shield.

The inside of the casing includes structural rigidity members providing rigidity to the casing without excess weight. The casing forming an inner containment cavity which allows for placement of most any type of child car seat and includes various provisions for locking a child car seat in position. Slots are also provided along the bottom of the device allowing insertion of a seatbelt to secure the casing and child car seat.

A first embodiment of the invention allows the shield to rotate in an upward position while an alternative provision allows the shield to rotate in a forward position each allowing access to the confines of the device. An alternative embodiment may include a molded seat thereby eliminating the use of a conventional child car seat. However, the shape of the device would remain the same with the transparent safety shield placed over a large portion of the opening of the device with provisions to allow the child's feet to extend outward from a bottom portion which further allows for ventilation.

Thus, an object of the instant invention is to provide a child safety seat accessory that encompasses a child and provides a shield to prevent intrusion of frontal and side air bag deployment into a child's environment.

Yet another object of the instant invention is to provide an inexpensive seat containment casing for use with conventional child seats.

Yet another object of the instant invention is to disclose a device that can be secured to an automobile seat by use of an available seatbelt or shoulder belt, and includes a universal attachment for securement of a child's car seat within the confines of the safety device.

Still another objective of the instant invention is to disclose a child safety device that includes a seat formed integral therein to provide a secure housing without the need for an additional child car seat.

Other objects and advantages of this invention will become apparent from the following description taken in conjunction with the accompanying drawings wherein are set forth, by way of illustration and example, certain embodiments of this invention. The drawings constitute a part of the specification and include exemplary embodiments of the present invention and illustrate various objects and features thereof.

BRIEF DESCRIPTION OF THE DRAWINGS

FIG. 1 is a pictorial view of a first embodiment of the invention with a wraparound shield placed in an open position;

FIG. 2 is a pictorial view of the first embodiment having the protective shield in a closed position.

FIG. 3 is a pictorial view of a second embodiment of the instant invention with a protective shield hinged at the bottom of the housing structure and placed in an open position.

FIG. 4 is a pictorial view of the second embodiment having the protective shield physically attached to the casing and shown in a closed position;

FIG. 5 is a partial cross sectional view of the second embodiment protective shield illustrating the lock down tab formed integral to the shield.

DETAILED DESCRIPTION OF THE PREFERRED EMBODIMENT

Figure 6:
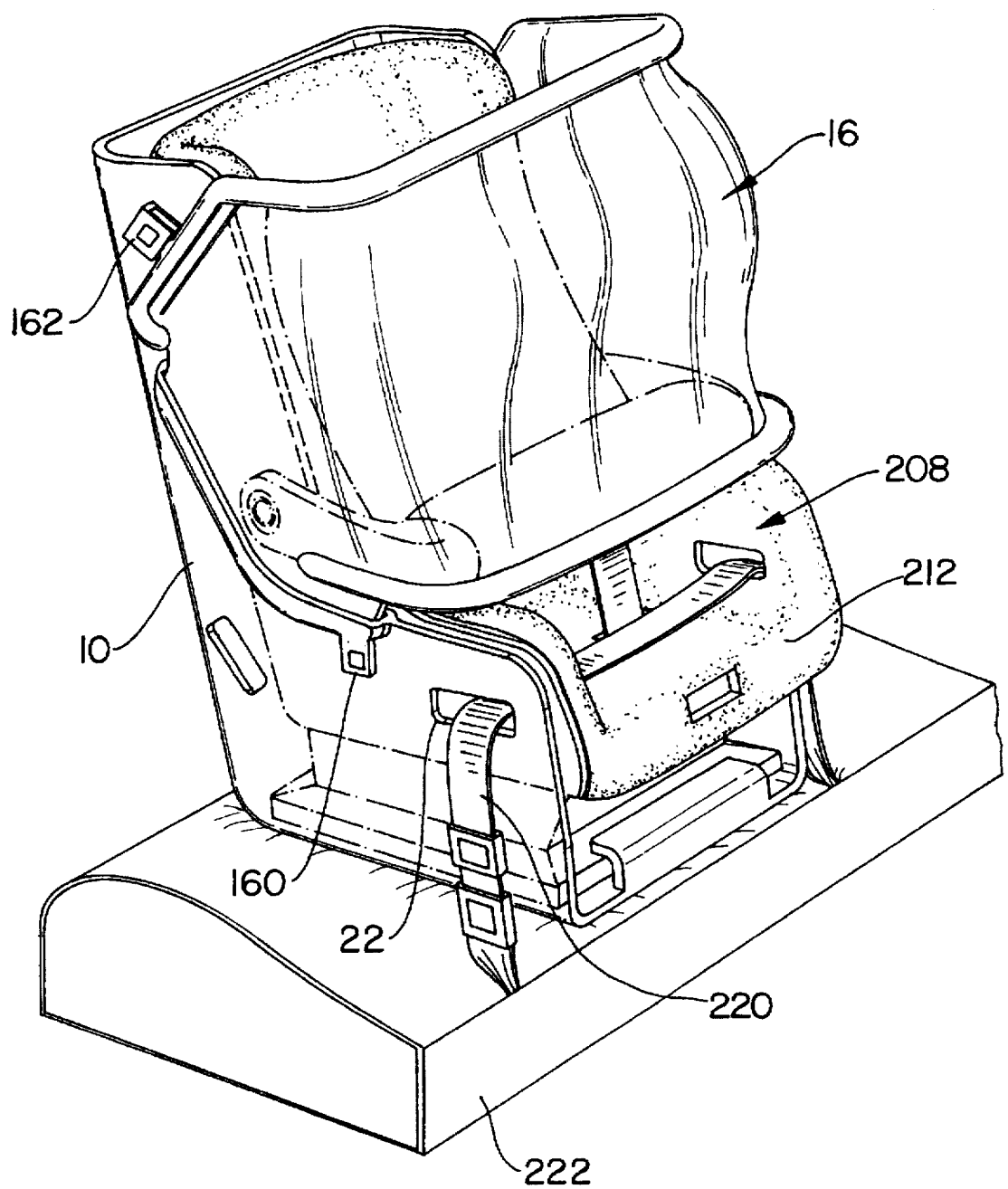
FIG. 6 is a pictorial view of the first embodiment illustrating upper and lower detachable mounts.

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Now referring to FIG. 1, set forth is a first embodiment of the instant invention consisting of a seat containment casing 10 defined by an exterior surface formed from sidewall 12, a backwall and opposite sidewall not shown, and base 14. The casing 10 is preferably constructed of a lightweight plastic having structural integrity capable of withstanding frontal and side impact. A protective shield 16 is pivotally secured to the seat containment casing 10 along the top portion depicted by numeral 18. The casing includes a rear aperture slot 20 for placement of a lap harness 200 and seatbelt harness 202 allowing for securement of the seat containment casing 10 to the seat 204 and seat back 206. The base 14 may further include a plurality of openings, not shown, to accommodate the various types of seatbelts and seat arrangements within a vehicle for the purpose of securing the seat containment casing in a secure position.

Preferably, the casing 10 is constructed from a single piece of rigid plastic with the protective shield 16 made from a single piece of transparent rigid plastic such as optical grade plastic that allows the child to have unobstructed vision. A frontal slot 22 is also provided for placement of a seatbelt capable of extending through and cooperating with a variety of child car seats that have a slot 208 formed integral with a conventional child car seat 210. Slot 22 is sized to allow passage of a seatbelt across the seat portion 212 of the child car seat 210 so as not to interfere with the placement of a child within the structure.

Bracket 24 is formed integral to the base 14 and extends upward and rearward so as to secure the base 214 which forms the support structure for most child car seats. As shown by way of illustration, the child car seat 210 includes an independent harness 216 and a padded frontal bar 218 with a hold down strap 220, all used for securing a child in an upright position. The child carrier 210 is typically mounted directly to a car seat in either a frontward or rearward facing direction and allows for proper positioning of a child for protection during the car accident. However, the conventional child car seats do not protect a child from flying debris or the intrusion of an air bag which has been found to extend and inflate at such a velocity so as to impact the child, leading to irreparable harm. The use of a protective shield 16 further protects the child from flying debris as well as intrusion of the air bag.

The safety seat containment casing 10 is sized to allow insertion of the conventional or production child safety seat directly into the inner containment cavity formed by the containment casing 10. The base of the child car seat is positioned beneath hold down bracket 24 with provisions for securing the remainder of the child car seat by use of a plurality of apertures formed in the back of the casing, not shown, which allow attachment to complimentary pulldown slots typically found in the back of a conventional car carrier. It should be noted that a variety of securement devices may be used for positioning within the casing and are deemed within the scope of the invention.

The sideshell 12 includes a ridge 30 which is operatively associated with a corner edge 32 of the protective shield 16. The corner edge is insertable into the slot 30 through the pivotal rotation of the shield and prevents the protective shield 16 from flexing or moving out of position during impact. In addition, the protective safety shield has tab 34 which is insertable into receptacle 36 formed integral to the sidewall 12 of the seat containment casing 10. The receptacle 36 includes a push button release 38 in a similar format to that of a conventional car seatbelt. The second sidewall of the seat containment casing includes a duplicate receptacle and slot which allows for a secure attachment of the protective shield 16, as shown in FIG. 2, to prevent intrusion of the air bag into the space provided for placement of the child in the event of an accident.

As further illustrated in FIG. 2, the protective shield 16 is shown placed in a locked position with the tab 34 inserted into receptacle 36 and the leading edge 32 inserted into slot 34. The protective shield 16 is secured along its upper edge by the pivot points 18 and has a padded upper edge 40 and lower edge 42 so as to eliminate any sharp edges that may cause injury. The protective shield 16 is preferably contoured and may include a plurality of apertures, not shown, if additional ventilation is desired. It has been found that the contoured shape is beneficial in prohibiting drafts from reaching a child should a window be open or an air conditioner vent be directed at the child. It should also be noted that the protective shield 16 having a large bubble may provide the child with further space for movement of the head in the event of an accident without impacting the inside surface of the shield yet maintaining the shield in front of the child for purposes of preventing air bag intrusion. In addition, should the shoulder belts of the conventional child car seat be loose, an outwardly facing contoured shape should minimize injury to the child with a majority of the impact being directed to the padded handle that is positioned across the seat. This apparatus protects the child from side impacts wherein the unsuspected movement of the child is cushioned by the padded sidewalls of the car seat. Should the child be facing outward during an accident, the protective shield will also prevent intrusion of the air bag into the child's airspace.

Now referring to FIG. 3, set forth is a second embodiment of the instant invention. Consisting of a safety seat containment casing 100 defined by sidewall 102, a backwall and opposite sidewall not shown. As with the previous embodiment the seat containment casing is preferably constructed of a lightweight plastic having structural integrity capable of withstanding frontal and side impact. In this embodiment, protective shield 106 is pivotally secured to the seat containment casing 100 along a bottom portion as depicted by numeral 108. The shell includes a rear aperture slot 120 for placement of a lap harness 250 to secure the casing 100 to the seat 252 and seat back 254. The casing 100 includes a base, not shown, in a similar format to the first embodiment which may include openings to accommodate various types of seatbelt configurations allowing for universal attachment of seatbelts.

In this embodiment the protective shield 106 is again made of a transparent rigid plastic that allows a child to look through the shield as well as the parent to have an unobstructed vision to confirm the condition of the child. A frontal slot 122 allows placement of a child's legs through the shield. The seat containment casing 100 allows placement of a conventional car seat 210 having an independent belt harness 216 and padded frontal bar 218 with a padded frontal bar hold down strap 220. The child carrier 210 is typically mounted directly to a car seat in either a frontward or rearward facing direction and allows for proper positioning of a child for protection during a car accident.

The sides of the seat containment casing 100 include a receptacle 124 which is molded into the side surface 102 forming a receptacle for the leading edge 126 of the protective shield 106. The leading edge 126 is insertable into the flat 124 during the pivotal rotation of the shield 106 which prevents the shield 106 from flexing or moving out of position during impact. In addition, the protective safety shield 106 includes insertion tabs 128 and 130 which is insertable into receptacle 132 and 134 each formed integral to the sidewalls of the seat containment casing. Each receptacle includes a push button release 136 in a similar format to that of a conventional car seatbelt release mechanism. The upper portion of the shield includes a reverse receptacle 140 which is operatively associated with the mating edge 142 of the seat containment casing. The opposite sidewall of the seat containment casing also forming an edge for receipt of a receptacle located on the upper portion 144 along the opposite side of the protective safety shield 106.

As shown in FIG. 4, the seat containment casing forms nearly a complete enclosure with opening 122 available for placement of the child's legs when the protective safety shield 106 is placed in a closed position. The closed position is shown with the insertion tabs placed within receptacles 132 and 134 thereby maintaining the protective safety shield in a fixed position in relation to pivot coupling point 108. The upper edge 146 may include a padded surface to prevent injury to a person that comes in contact with the edge. Similarly, the edge opening 148 which circles opening 122 may consist of a padded liner to prevent scratching of the child's legs when placed through the opening. As shown in FIG. 4, additional slots 150 and 152 allow for placement of a seatbelt across the surface of the child's seat.

Referring to FIG. 5, the child car seat 210 can be secured into this device by rotation of the protective shield 106 into a closed position wherein a lip projecting inwardly from the shield is used for biasing a front portion 240 of the child car seat in a downward position so as to prevent moving of the child car seat when the front protective shield is in a closed and locked position.

FIG. 6 illustrates the protective shield 16 of the first embodiment having a lower rotatable locking receptacle 160 and an upper locking receptacle 162. A reciprocal locking mechanism is located on the opposite side surface of the casing 10, not shown. The protective shield 16 is secured along its upper edge by the upper locking receptacle 162 which is rotatable allowing the shield to swing upward upon release of lower locking receptacle 160. Similarly, the protective shield 16 is rotatable in a downward position upon release of the upper locking receptacle 162. The protective shield may also be removed completely if both upper and lower locking receptacles are released. This drawing illustrates that a variety of pivot or latching mechanisms can be deployed, all of which are deemed with the scope of this invention. Slot 22 of the casing 10 illustrates the placement of a seatbelt 220 across the seat 212 through slot 208 on the opposite side, the seatbelt 220 securing both the child car seat 212 and the casing 10 to the seat 222 of a vehicle.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. A child safety seat accessory apparatus for mounting in an automobile equipped with seatbelts and passenger-side air bags to protect an occupant child, said apparatus comprising:
   - a seat containment casing with an inner containment cavity and an exterior surface with upper and lower sides, said inner containment cavity having an attachment means for releasably mounting a production child safety seat therein, said exterior surface having receiving means for incorporating said automobile seatbelts to securely hold said casing to said automobile seat;
   - a protective shield constructed from a transparent, high impact plastic with upper, lower, and inner facing edge surfaces, said shield pivotally mounted to said seat containment casing to extend across the front of said child safety seat in a first shielding position, said shield rotatable to a second access position to allow placement and removal of a child within said child safety seat; and
   - a containment groove for receipt of said inner facing edge surfaces of said protective shield when said shield is rotated to said first shielding position;
   - whereby said protective shield serves to protect said occupant child from the impact of said passenger-side air bag and flying debris associated with an automobile accident.

2. The child safety seat accessory apparatus of claim 1, wherein said protective shield is U-shaped with an upper and lower portion, said shield being pivotally mounted through said upper portion of said shield onto each upper side of said seat containment casing, whereby said second access position is achieved by swinging said protective shield upward on said pivotal mounts.

3. The child safety seat accessory apparatus of claim 1, wherein said protective shield includes a latching means for securing said shield in said first shielding position.

4. The child safety seat accessory apparatus of claim 1, wherein said receiving means for said automobile seatbelt includes holes through said containment casing.

5. A child safety seat accessory apparatus for mounting in an automobile equipped with seatbelts and passenger-side air bags to protect an occupant child, said apparatus comprising:
   - a seat containment casing with an inner containment cavity having a given span and an exterior surface with upper and lower sides, said inner containment cavity having an attachment means for releasably mounting a production child safety seat therein, said exterior surface having receiving means for incorporating said automobile seatbelts to securely hold said casing to said automobile seat, and said exterior surface having one releasable latching means on each side;
   - a protective shield having upper and lower portions, and upper and inner facing edge surfaces, said lower portion of said shield releasably and pivotally mounted with a lower pivoting means through each said lower side of said containment casing, with said upper portion of said shield releasably secured on each side with said releasable latching means;
   - whereby said protective shield can be pivotally placed across said containment cavity in a first shielding position, said shield rotatable to a second access position by pivoting said shield downward about said pivoting means to allow placement and removal of a child within said child safety seat, or said protective shield can be replacably removed altogether by releasing said pivoting means and said latching means; and
   - whereby said protective shield serves to protect said occupant child from the impact of said passenger-side air bag and flying debris associated with an automobile accident.

6. The child safety seat accessory apparatus of claim 5, wherein said protective shield is constructed from a transparent, high impact substance and extends across the chest and facial areas of a child sitting in said child safety seat.

7. The child safety seat accessory apparatus of claim 5, wherein said protective shield extends across said full span of said containment cavity, said shield further including an aperture for placement of a safety seat occupant's legs through said protective shield.

8. The child safety seat accessory apparatus of claim 5, wherein said upper edge surfaces and a portion of said inner facing surfaces of said protective shield include padding.

9. The child safety seat accessory apparatus of claim 5, wherein said containment casing includes a containment groove for receipt of said inner facing edge surfaces of said protective shield when said shield is rotated to said first shielding position.

10. The child safety seat accessory apparatus of claim 5, wherein said releasable latching means includes pushbutton-type latches mounted on said containment casing with corresponding latch inserts extending from said protective shield.

11. The child safety seat accessory apparatus of claim 5, wherein said releasable latching means includes a rotatable latching means and said protective shield can thereby be pivoted to a third access position by releasing said lower pivoting means and rotating said protective shield upward about said rotatable latching means.

* * * * *